Aug. 1, 1967 M. W. SIMS 3,333,335
METHOD FOR ALTERING THE OVERALL CONFIGURATION OF ELECTRICAL
COILS WOUND FROM A NUMBER OF CONDUCTOR TURNS
Filed Nov. 30, 1964 4 Sheets-Sheet 1
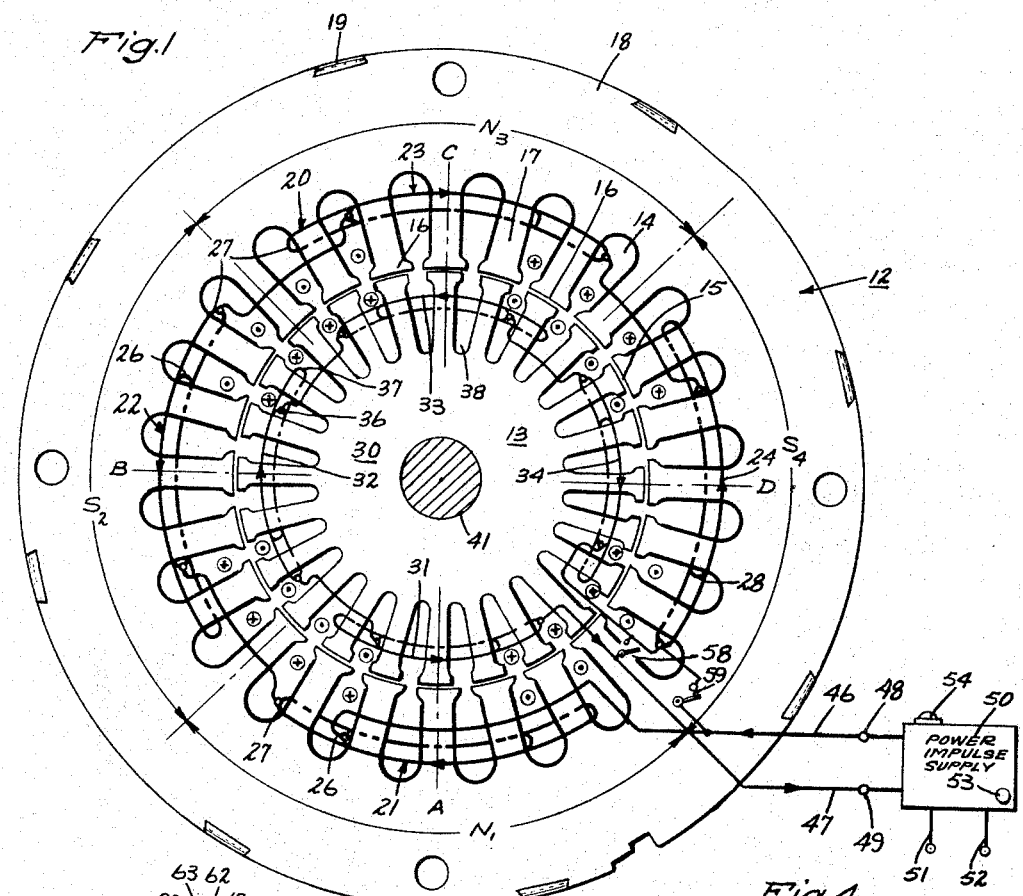
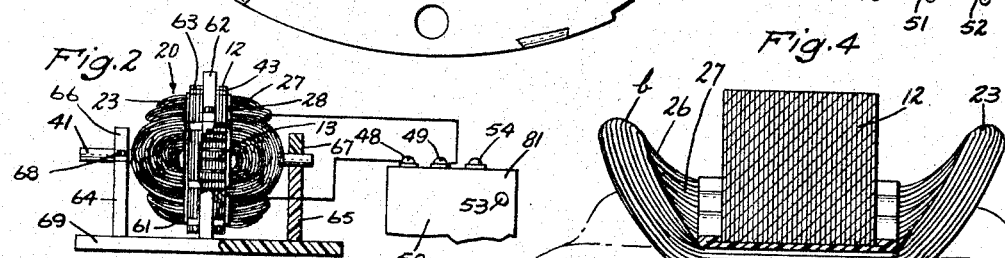
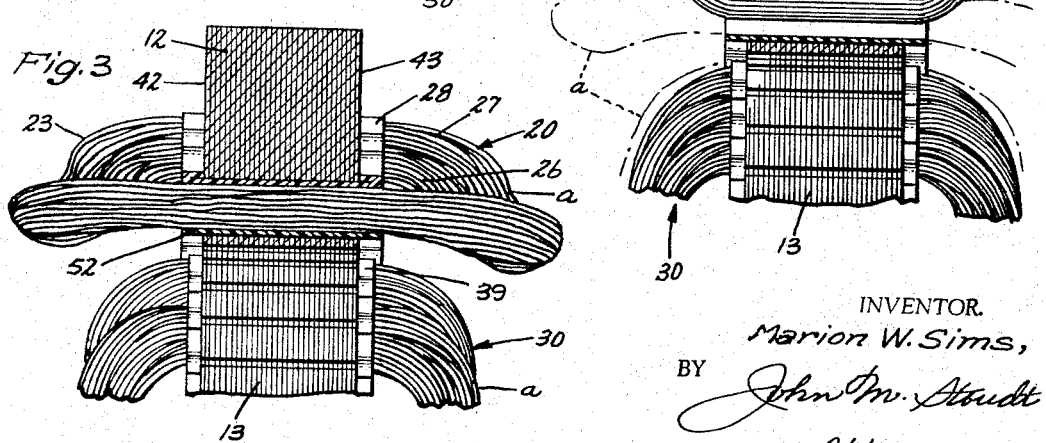
INVENTOR.
Marion W. Sims,
BY
John M. Staudt
Attorney.

Aug. 1, 1967 M. W. SIMS 3,333,335
METHOD FOR ALTERING THE OVERALL CONFIGURATION OF ELECTRICAL
COILS WOUND FROM A NUMBER OF CONDUCTOR TURNS
Filed Nov. 30, 1964 4 Sheets-Sheet 2
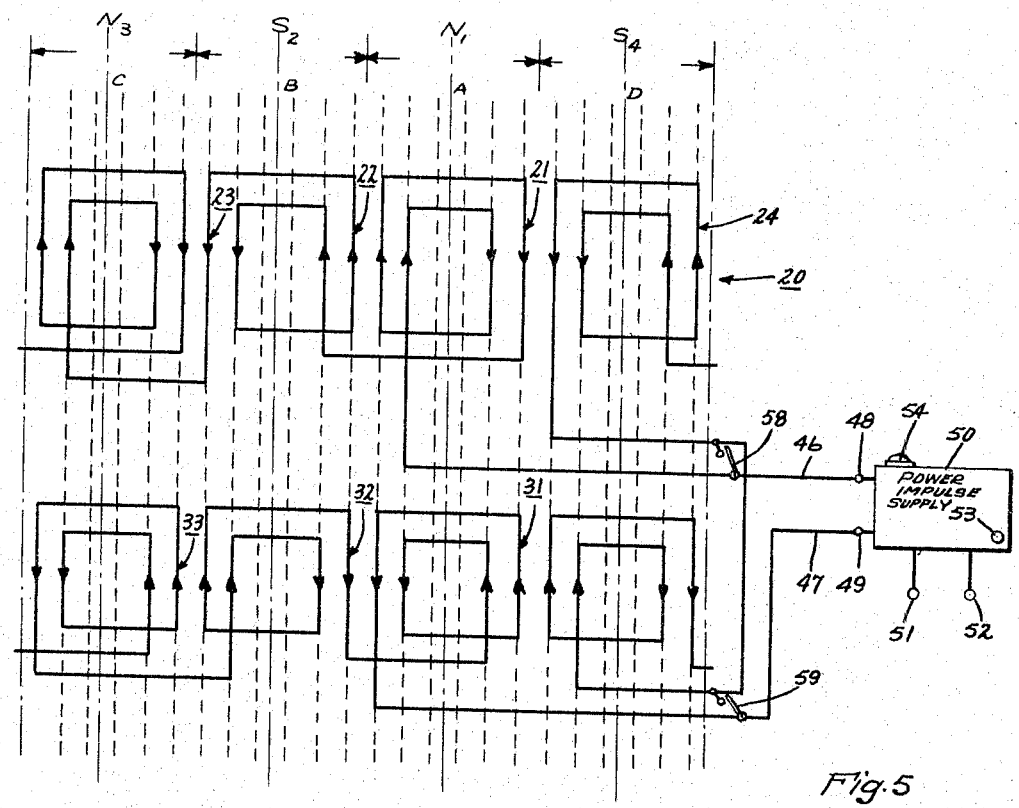
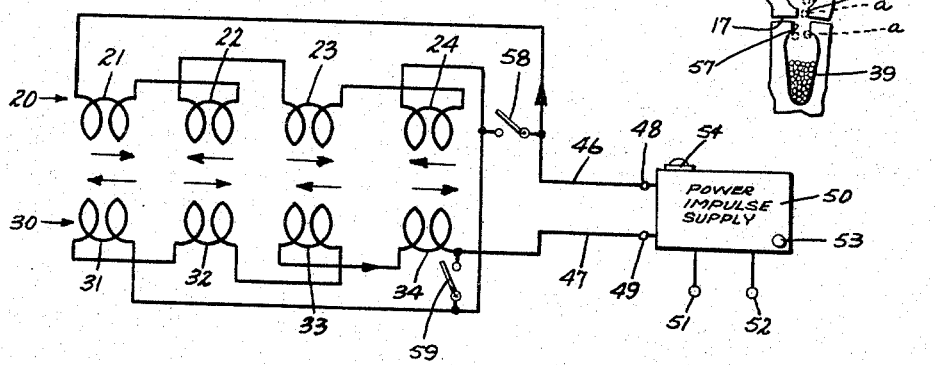
INVENTOR.
Marion W. Sims,
BY John M. Stoudt
Attorney.

Aug. 1, 1967     M. W. SIMS     3,333,335
METHOD FOR ALTERING THE OVERALL CONFIGURATION OF ELECTRICAL
COILS WOUND FROM A NUMBER OF CONDUCTOR TURNS
Filed Nov. 30, 1964     4 Sheets-Sheet 3
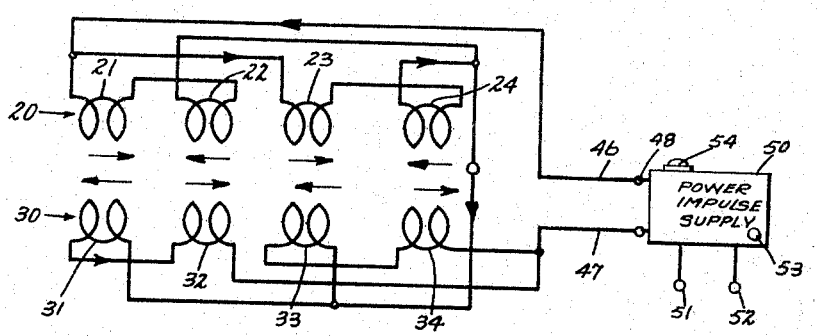
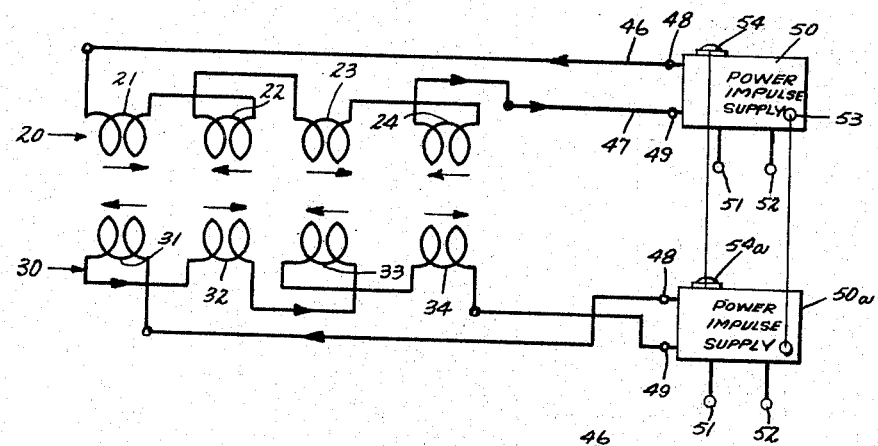
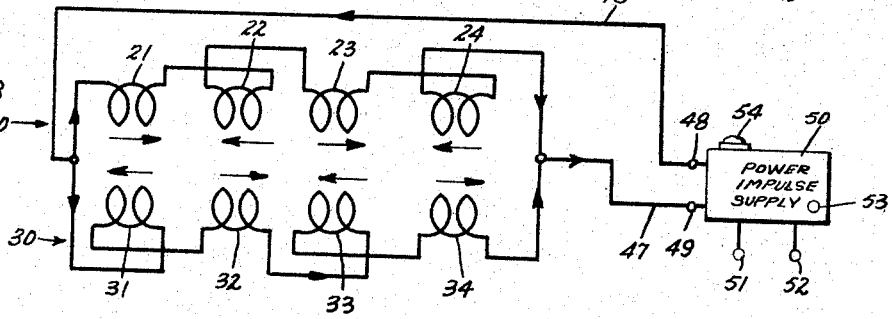
INVENTOR.
Marion W. Sims,
BY John M. Stoudt
Attorney.

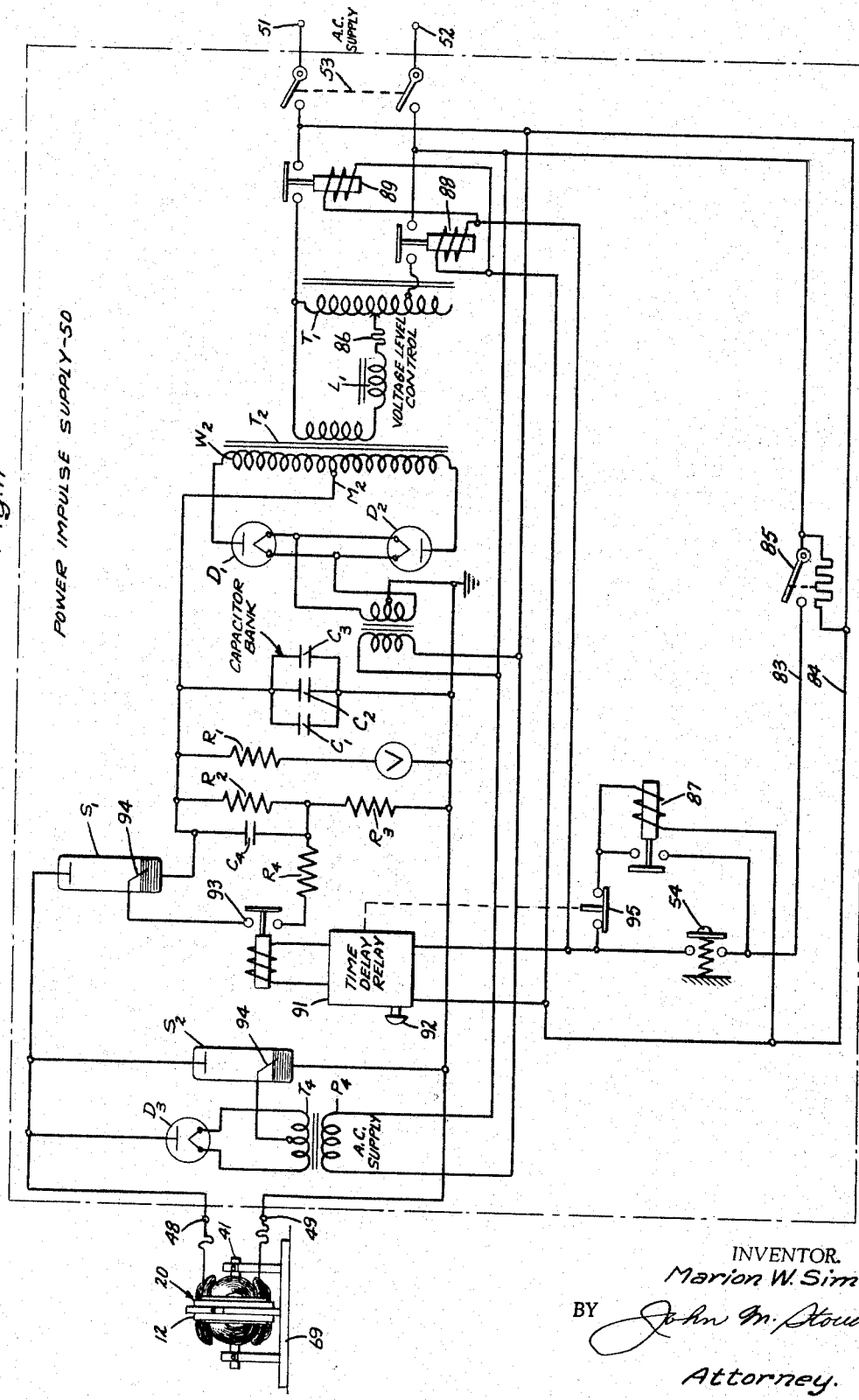

United States Patent Office 3,333,335
Patented Aug. 1, 1967

3,333,335
METHOD FOR ALTERING THE OVERALL CONFIGURATION OF ELECTRICAL COILS WOUND FROM A NUMBER OF CONDUCTOR TURNS
Marion W. Sims, Fort Wayne, Ind., assignor to General Electric Company, a corporation of New York
Filed Nov. 30, 1964, Ser. No. 414,824
6 Claims. (Cl. 29—606)

The instant invention relates generally to an improved method for altering the overall configuration of electrical coils wound from a number of conductor turns. It more specifically relates to an improved and novel method for compacting a number of conductor turns into a tight bundle and for contouring the bundle into a desired configuration.

In one manufacturing technique in constructing electrical inductive devices, such as dynamoelectric machine magnetic stator cores, a number of electrical coils are inserted into the slots of the core. It is highly desirable, if not essential, that the coil turns be compact as possible and that they provide a particular overall configuration. By way of illustration, stator cores of fractional and small horsepower motors normally accommodate coils of an excitation winding phase such that portions of the individual coils are carried in the slots of the core radially outward from an armature receiving bore and other portions, usually referred to as end turns, extend axially beyond each end face of the core. It is desirable in order to furnish adequate space for coils of another winding phase that the coil turns should occupy as little space as possible. This, in turn, permits ease in the installation of the second winding phase onto the stator core and allows an increase in the number of conductor turns which can be accommodated in a given slot. Moreover, the end turns of the coil should be located away from the bore so that they allow the end turns of the second winding phase to project away from the bore. Consequently, among other reasons, the end turns of neither winding phase will interfere with the relative rotation of the stator and rotor members.

The manner in which the desired features oulined above are obtained must not adversely affect the insulation on the turns; e.g., nicking or chipping it off, otherwise, the turns may short out to cause premature operational failure of the windings. It is also desirable that the manner of achieving the foregoing features be versatile in nature, that is, capable of efficient use with a variety of core and coil structures and that the features be inexpensively attained.

Accordingly, it is a primary object of the present invention to provide an improved method for altering the overall configuration of electrical coils wound from a number of conductor turns and improved arrangements for carrying out the method.

It is another and more specific object of the invention to provide an efficient, inexpensive, and versatile method for compacting the conductor turns of electrical coils accommodated in the slots of a magnetic core and for contouring the coils into the desired configuration.

It is yet another object of the present invention to provide an improved method for altering the overall configuration of coils accommodated by a magnetic stator core which achieves the desirable features mentioned above.

In carrying out the method of my invention in one form, I provide an improved method for altering the configuration of at least one electrical coil of a winding wound of a number of insulated conductor turns carried by a magnetic core, with the at least one coil defining a magnetic pole. Another winding coil is supported relative to the first winding coil such that it defines a magnetic pole in proximity to the magnetic pole of the first winding coil. At least one high electrical power impulse of predetermined intensity, having a magnitude below that which deleteriously affects the insulation of the first winding coil, is simultaneously applied to the winding coils to produce a surge of current flow in the respective turns of the coils. This flow establishes opposing magnetic fields at the magnetic poles for the respective winding coils. The currents flowing through the coils and the magnetic fields interact to produce electromagnetic forces which act upon at least one of the winding coils to effect alteration of it into the desired configuration.

Where the coil being acted upon is part of a stator winding and its accommodating member is a stator core and the other winding coil is supported in the bore of the stator core, the desired alteration achieved may be the compaction of the side portions of the coil carried in the slots of the stator core into a tight bundle. The desired alteration may also include compaction of the end turn portions which project beyond the end faces of the stator core member, and their being forced back axially toward the end faces of the core member and radially away from the coil held in the stator bore.

This method is not only efficient and economical to practice, but it also consumes little time to carry out and results in an improvement in altering the contour of the coil. In addition, these features are achieved while unusually high forces can be developed to act upon the coil under consideration without adversely affecting the coil insulation. Further, in regard to stator coils the compaction of the coils and the attainment of the desired overall configuration permit ease in the installation of another winding onto the stator member by increasing the available space for it. The method is also versatile in nature and simple to carry out in actual practice.

The subject matter which I regard as my invention is particularly pointed out and distinctly claimed in the concluding portion of this specification. My invention itself, however, both as to its organization and method of operation, together with further objects and advantages thereof, may best be understood by reference to the following description taken in connection with the accompanying drawings in which:

FIGURE 1 is an end view of one winding accommodated in the slots of a winding accommodating structure in the form of a stator core member and a second winding, carried by an armature core member arranged in the bore of the stator member, having electrical coil groups disposed in a polar relation, with the electrical coil groups being schematically displayed in the slots of their accommodating core members and being serially connected in circuit to a power impulse supply in accordance with one form of my invention;

FIGURE 2 is a side elevational view, partly broken away, of the arrangement revealed in FIGURE 1, to illustrate an arrangement which may be used to practice the method of the present invention;

FIGURE 3 is an enlarged fragmentary transverse sectional view of part of the two core members and their winding coil groups shown in FIGURE 1, the view displaying certain coils of each core member after the initial insertion of the coil side portions into the slots but before one form of my method of the present invention has been carried out;

FIGURE 4 is a view similar to FIGURE 3, except that the coil groups are illustrated after they have been acted upon by one form of my method;

FIGURE 5 is a fragmentary view of one of the coil accommodating slots for each of the stator and armature members illustrated in FIGURE 1, the view revealing the compaction of the conductor turns in the slots for the two windings of the exemplification after one or more high power impulses have been applied simultaneously to the windings;

FIGURE 6 is a schematic polar development diagram for the stator and armature windings of FIGURE 1, illustrating their polar relationship as a power impulse is being simultaneously applied to them in accordance with one form of the present invention;

FIGURE 7 is a simplified circuit diagram illustrating the winding coil groups for the respective stator and armature members shown in the previous figure, the diagram showing the series circuit connections of the coil groups for both windings to the power impulse supply;

FIGURE 8 is another version of an arrangement in simplified circuit form for applying a high power impulse simultaneously to the coil groups carried by the stator and armature core members seen in FIGURE 1, with the coil groups of one winding being in parallel circuit to the coil groups of the other winding;

FIGURE 9 is yet another arrangement represented diagrammatically in the form of a circuit in which a pair of coil groups for each stator and armature winding, illustrated in FIGURE 1, are respectively connected in parallel circuit, and the windings are serially connected to a single high power impulse supply;

FIGURE 10 is a simplified circuit diagram showing a variation of the circuit arrangements of FIGURES 6, 7, and 8 in which high power impulses are simultaneously applied from separate supplies to the coil groups of the stator and armature core members illustrated in FIGURE 1; and FIGURE 11 is a schematic circuit diagram of a power supply circuit which may be incorporated in the arrangements shown in the other figures for producing the high power impulse in the winding coils in order to carry out one form of my invention.

Turning now specifically to the drawings and in particular to FIGURES 1 through 7 inclusive, I have illustrated various aspects of one form of my invention in connection with the simultaneous alteration of the overall configuration of two electrical windings arranged in the slots of dynamoelectric machine stator and armature core members 12 and 13. In FIGURE 1 with reference to stator core member 12, the slots, identified by numeral 14, are equidistantly spaced around central bore 15 defined by the tooth lips 16 of stator tooth sections 17. In the exemplification, the slots 14 are identical in shape and number twenty-four. Radially outwardly of slots 14, the tooth sections 17 are integrally joined to an annular yoke section 18. The stator core member is conventionally formed from a stack of magnetic laminations, stamped out of suitable thin sheet material, which are secured together in juxtaposed relation by standard keys 19 frictionally received in grooves extending transversely across the stator member 12.

A multi-polar main or field excitation winding 20 of the well-known distributed type is carried by slots 14 to define four magnetic poles of alternating polarity, $N_1$, $S_2$, $N_3$, $S_4$, respectively. Each coil group has two concentric coils 26, 27 symmetrically disposed about radial pole center axis A, B, C, and D of the respective poles, with each coil being conventionally wound from a predetermined number of insulated conductor wire turns, such as commercially available enameled copper wire. As seen in FIGURE 5, U-shaped slot liners 28 are provided in the customary way for electrically insulating the coil turn side portions carried in slots 14 from the walls of the slot to prevent the occurrence of grounds.

With respect to the second winding 30, carried in the bore 15 of the stator member by armature core member 13, it also includes four coil groups 31, 32, 33, 34 comprised of two concentric coils 36, 37 having coil sides accommodated in armature core slots 38. The coil groups also define four magnetic poles and, in order to derive maximum benefit of the force level attained in the practice of my invention, the armature core member is fixedly supported relative to the stator member such that each radial pole center axis of winding coil groups 31, 32, 33, 34 are in general radial alignment with the respective center axis of coil groups 21, 22, 23, 24 of stator winding 20. Standard U-shaped lines 39 (FIGURE 5), also electrically insulate the coil sides of winding 30 from the slot walls of the armature core member, which is formed of a stack of magnetic laminations, firmly secured to a central shaft 41.

As is illustrated in FIGURE 3, after the coils of windings 20 and 30 have been initially injected into slots 14 and 38 respectively or alternatively wound in place, the individual conductor turns in the coil side portions are loosely carried in the slots. In regard to the stator winding 20, the end turn portions, which project axially beyond the end faces 42, 43 of the stator core member 12, have a tendency to droop toward the axis of the stator member 12 and member 13.

In the exemplification of my invention, the individual turns of the coils for both windings are simultaneously compacted in their respective slots, as well as in the end turn portions, and the overall contour of the coils seen in FIGURE 3 is altered to the desired configuration. To achieve this end, as shown in the arrangement of FIGURES 1, 6, and 7, windings 20 and 30 are serially connected to each other and are connected by leads 46, 47 across terminal connectors 48, 49 of a single power impulse supply 50. The input terminals 51, 52 of supply 50 are adapted for connection to an alternating current supply through main off-on switch 53.

A high power impulse is applied simultaneously to windings 20 and 30 by depressing the pushbutton of a switch 54 after switch 53 has been closed to energize certain components of supply 50. As will be explained more fully below, the high power impulse is of a predetermined intensity, provided by first charging a capacitor bank of supply 50 to a selected voltage level and after an interval of time, the capacitor bank is discharged through the two windings 20 and 30 which are serially connected across terminal connectors 48, 49. As a consequence of this discharge, a sudden or rapid surge of current flow is produced in the individual coil groups of the windings, and opposed varying magnetic fields are established at the respective magnetic poles of each cooperating coil group for the two windings. Due to the interaction from the current surge in aligned magnetic poles of the two windings and the opposed magnetic fields established at each pair of cooperating coil groups or magnetic poles for windings 20 and 30, electromagnetic forces are exerted on the conductor turns which drive the cooperating coil groups away from one another. For example, referring specifically to FIGURES 1, 6 and 7 and to cooperative coil groups 21 and 31, the currents flowing through the coils in these two coil groups establish opposing magnetic fields at their magnetic poles which in turn produce forces acting upon the individual conductor turns to repel the coils in groups 21 and 31 away from one another.

The directions of current flow assumed in the exemplification when the high power pulse is applied to windings 20 and 30, are indicated by the arrows in FIGURES 1, 6 and 7 and by conventional symbols ⊕ and ⊙; the former symbol represents flow into the figures away from the viewer while the latter signifies a direction of flow upwardly toward the observer. It should be noted that the current surge in the coil turns distributed in any given slot of either core member is in the same direction which aids in the production of the establishment of satisfactory opposing magnetic fields at the respective magnetic poles of the cooperating coil groups.

The forces developed at the magnetic poles drive the side turn portions from their initial loose position a, shown by the broken lines in FIGURES 4 and 5, toward the bottom of their respective slots and rapidly against slot liners 28, 39 into compact bundles disposed in positions b for the coils in each cooperating coil group. The sudden deceleration of the coil side portions caused by the restraining slot walls augments the compaction. In addition, the coil end turn portions of the respective windings are forced away from each other into positions b shown in full in FIGURE 4. In regard to stator winding 20, this position for the end turn portions is radially beyond the bottom of the slot walls and axially toward the end faces of the stator member.

It may be desirable in actual practice to employ more than one high power impulse to the winding coils to effect the desired coil alteration. For example, as shown in phantom in FIGURE 5, before my method has been carried out, a few conductor turns in the slots may be disposed near the slot entrances 56, 57 where they are not adequately insulated from the core walls. Thus, a first high power impulse somewhat lower than might otherwise be chosen may be applied concurrently to serially connected windings 20 and 30 to drive the conductor turns away from the slot entrances. A second high power impulse of greater intensity may then be directed into the winding to obtain the desired final coil configurations.

The force level which should be utilized between cooperating magnetic poles of the respective windings 20 and 30 to attain the desired coil alterations, such as compaction and end turn force back, will be dependent upon several factors including conductor cross-section and total length, exact composition of the conductors and their resistance to movement, extent of coil alteration desired, and the proximity of and degree of misalignment between the cooperating magnetic poles for windings 20 and 30 respectively.

In order to derive an unusually high force level in windings 20 and 30 of the exemplification, it is desirable that not only are the magnetic poles of cooperating pole groups arranged with generally coincident radial centers, but, in addition, the span of the cooperating coil groups should be approximately the same number of electrical degrees. Further, it will be obvious to those skilled in the art that when two windings are being altered at the same time, such as windings 20 and 30 of the exemplification, it is desirable to select a high power impulse that will provide the desired force level below that which will deleteriously affect the most sensitive insulation of the two windings.

In order to afford protection for the insulation on the conductor turns of windings 20 and 30, in the exemplification of FIGURES 1–7 inclusive, I have provided a switching element 58 in circuit across winding 20 and a switching element 59 across winding 30 seen in FIGURES 1, 5 and 6. These elements may take the form of a standard voltage sensitive vacuum tube having its grid connected to one side of the supply 50. Should the voltage reach the maximum value considered safe for the insulation, the tube would fire and in effect "lock in" the current already existing in the winding to permit the coil alteration action to be completed in the manner described above.

If it is desired to alter the overall configuration of only one of the armature or stator windings of the exemplification, my method, by way of example, can advantageously be practiced by using, as the second winding and its accommodating member, a primary winding fixedly carried by a member constructed in accordance with the disclosure of the Clovis E. Linkous patent application, Ser. No. 414,825, filed on the same day as this application. The primary winding and its accommodating member of Linkous may be fixedly and selectively supported relative to either one of the windings 20 or 30 in the exemplification and connected as the other or second winding in circuit as I have illustrated in the various figures.

In order to support members 12 and 13 of the exemplification in the proper stationary relation, any suitable equipment may be employed, such as that shown in FIGURE 2. Merely by way of example, stator member 12 is rigidly held in an upright cradle 61 by a removable clamping bracket 62 fastened to the cradle by screws 63. Upright supports 64 and 65 mount shaft 41 of armature member 12 in either side of cradle 61 and is prevented from movement by removable clamping elements 66 and 67 secured to the respective supports by screws 68. The individual supports and cradle are all rigidly attached to a base plate 69.

Turning now to the arrangements disclosed in FIGURES 8 through 10 inclusive, each shows a variation of the arrangement of the first exemplification for simultaneously applying at least one high power impulse to windings 20 and 30 of the first exemplification and may be employed in the practice of my method of coil alteration already described. In these latter three figures, like parts to those used in FIGURES 1 through 7 inclusive are identified by like reference numerals. The arrows employed in the circuit arrangements of FIGURES 8, 9, and 10 indicate an assumed direction of current flow when a high power impulse is applied to windings 20 and 30 during the practice of my method.

In FIGURE 8, the coil groups of winding 20 are connected in parallel circuit with coil groups for armature winding 30. Leads 46, 47 connect the windings across power impulse supply 50. This arrangement is advantageous when it is desired to provide a low voltage level on the coils of the windings for a given level of forces at the opposed magnetic poles or cooperating pairs of coil groups.

With respect to those situations in which it is desirable to match the impedance of the windings with that of a single power impulse supply 50, certain coil groups of each winding may readily be connected in parallel circuit with one another, with the coil groups being connected across the supply 50 by leads 46 and 47. For example, in FIGURE 9, coil groups 21 and 22, in series circuit, are connected in parallel with serially connected coil groups 23 and 24 of stator winding 20. In a like manner, serial coil groups 31 and 32 are in parallel circuit with serial coil groups 33 and 34.

FIGURE 10 illustrates the simultaneous application of a high power impulse directed to the coil groups of windings 20 and 30 from two separate supplies 50 and 50a, which may be identical in construction but have differing voltage settings to obtain different force levels for each of the windings. These supplies are concurrently energized by depressing their respective pushbutton switches 54 and 54a, and each supplies a high surge of current to its associated winding to produce the different force levels in the opposed poles. This separate control is desirable, for example, where there is a large variation between the number of turns and wire size employed for the respective windings or where the Linkous primary winding is employed as either winding 20 or 30.

FIGURE 11 reveals a simplified circuit diagram of one type of power impulse supply which may be incorporated in the illustrated arrangements already described to practice the method of the present invention. This supply circuit is identified by the legend "power impulse supply" and numeral 50 in the various figures of the drawings. The components of the supply circuit may be housed in cabinet 81 (FIGURE 2) with main off-on switch 53 and pushbutton switch 54 being mounted on the cabinet for easy access. The illustrated supply 50 includes a bank of three parallel connected storage capacitors $C_1$, $C_2$, and $C_3$, chargeable as a unit to various regulated voltage levels between 500 and 4000 volts which are subsequently discharged to provide a high electrical energy surge of preselected magnitude by switching an ignitron $S_1$ into conduction. With main switch 53 in the closed position, primary windings $P_3$, $P_4$ of the filament transformers $T_3$, $T_4$ are immediately activated. It will also be seen that the circuit, which includes pushbutton switch 54 and leads 83, 84, is not originally energized until after an interval of time as determined by thermostatic time delay switch 85. In this way, the grids of the rectifier tubes $D_1$, $D_2$, and $D_3$ are allowed to warm up for at least 30 seconds before plate voltage is applied to the rectifier tubes, which are of the liquid vapor type, necessitating the warm-up period.

In order to regulate the voltage level on the bank of capacitors $C_1$, $C_2$, and $C_3$ (see the appropriate legends in FIGURE 11), adjustable arm 86 of the autotransformer $T_1$ is movable for regulating the voltage to the desired level. In the application of this power supply to my invention, the magnitude of the high power impulse may be readily selected by controlling or regulating the voltage level to which the capacitors $C_1$, $C_2$, and $C_3$ are charged.

As previously noted, the charging of the capacitor bank is initiated by depression of the pushbutton for switch 54. This momentary closing of switch 54 causes the normally open relay 87 to close, whereupon the coils of the two normally closed relays 88 and 89 are also energized supplying alternating current across the autotransformer $T_1$. When relay 87 closes, time delay relay 91 is also actuated. After a time delay determined by the setting on the control 92, relay 93 is operated to provide a positive potential applied at starter rod 94 of ignitron $S_1$, which is then switched to a conductive state. Ignitrons $S_1$ and $S_2$ illustrated in the circuit are mercury-pool cathode-arc rectifiers with a starter rod immersed in the mercury pool. When a positive potential is supplied at the starter rod of the ignitrons, sparking occurs at the junction of the rod and mercury pool causing the formation of a cathode spot, with the anode passing current in the usual way.

With ignitron $S_1$ in a conductive state, time delay relay 91 momentarily opens contacts 95 to restore relays 87, 88, and 89 to their normally open positions after an interval of time. The illustrated time delay relay is of the commercially available type being driven by a small synchronous motor coupled to a gear train. At the termination of the time delay interval, the contacts of a microswitch close and energize relay 93.

It should be noted at this time that when time delay relay 91 and control autotransformer $T_1$ have been energized, the output of the control autotransformer is applied across the primary winding $P_2$ of step-up autotransformer $T_2$. To limit the peak current, a choke $L_1$ is connected in series with primary winding $P_2$. To furnish a full wave rectified current for charging the capacitors $C_1$, $C_2$, and $C_3$, the pair of high voltage rectifiers $D_1$ and $D_2$ are connected in the secondary circuit of step-up transformer $T_2$.

The secondary winding $W_2$ is in turn tapped at its center tap $M_2$ so that the voltages between each end of the secondary winding $W_2$ is of such polarity that its upper end is positive with respect to the center tap $M_2$, the plate of the high voltage rectifier $D_1$ becomes positive with respect to its cathode. The rectifiers $D_1$ and $D_2$ alternately conduct in conformance with the changing polarity of the input voltage. By connecting a voltmeter V in series with a multiplier resistor $R_1$ across the bank of capacitors, a voltage reading may readily be taken of the voltage level on the capacitor bank.

The full wave rectified output is additionally utilized for the purpose of charging a capacitor $C_4$ through a voltage divider consisting of resistors $R_2$ and $R_3$. Approximately four-tenths of the full wave rectified voltage is applied across the capacitor $C_4$. A resistor $R_4$ is connected in the discharge circuit of the capacitor $C_4$ to control its discharge rate when the relay 93 is actuated to the closed position.

By way of a more specific illustrative example of energy surge supply 50, the following identified components may be incorporated in the aforedescribed circuit in FIGURE 11 and used in accordance with the principles of my invention:

| Component identification: | Specification of the components |
|---|---|
| Control autotransformer $T_1$ | General Electric 9H60LA10X. |
| Step-up transformer $T_2$ | Stancor P-8034. |
| Choke $L_1$ | Stancor C-2688, —010 henries. |
| Rectifiers $D_1$, $D_2$, $D_3$ | Mercury vapor rectifiers 872A. |
| Filament transformer $T_3$ | Stancor 5 volt, 15 amperes P-6433. |
| Filament transformer $T_4$ | Stancor 5 volt, 10 amperes P-6135. |
| Ignitrons $S_1$, $S_2$ | GL5550 ignitron. |
| Capacitors $C_1$, $C_2$, $C_3$ | 210 microfarads, 5000 volts. |
| Capacitor $C_4$ | .05 microfarad, 2000 volts. |
| Resistor $R_1$ | 5 megohms. |
| Resistor $R_2$ | 2 megohms. |
| Resistor $R_3$ | 3 megohms. |
| Resistor $R_4$ | 20 megohms. |

It will be recognized by those skilled in the art, of course, that other kinds of power impulse supply circuits may be utilized in my arrangements to practice the method of the present invention without departing from the scope and spirit thereof.

Turning now to a brief description of the way in which the foregoing described power impulse supply circuit of FIGURE 11 may be utilized in the practice of my invention, the adjustable arm 86 on the control autotransformer $T_1$ is initially set to provide a selected voltage between the center point $M_2$ and one end of the secondary winding $W_2$ of the step-up transformer $T_2$. For a bank of capacitors having the fixed capacitance of 210 microfarads and a preselected first power impulse of 2767 joules is desired for altering the coils of windings 20 and 30 of the illustrated exemplification, arm 86 of the voltage level control should be set to charge the bank with the selected voltage of 3000 volts. This is the order of magnitude satisfactory for many applications using copper wire for the turns having a bare diameter of .04 inch and a polyvinyl formal resin coating.

With the main switch 53 closed and the filament transformers energized for an interval of approximately thirty seconds, the grids of the high voltage rectifiers become warmed up. The time delay switch closes, supplying power to leads 83 and 84. The circuit is now in stand-by condition, and the capacitor bank can be charged by the operator at his discretion by depression of the button for switch 54.

Once the capacitors $C_1$, $C_2$, and $C_3$ have been charged to the selected voltage level and the 15 second time delay period has terminated, relay 93 causes the capacitor $C_4$ to discharge through the starter rod 94 of ignitron $S_1$. When the ignitron has been triggered into a conductive condition, it functions as a switch and discharges the capacitor bank ($C_1$, $C_2$, $C_3$), which directs the preselected power surge to the illustrated windings 20 and 30 through terminal connectors 46 and 47.

When the polarity of the voltage across the terminal connectors 46, 47 reverses, the voltage on the plate of the high voltage rectifier $D_3$ becomes positive, and it is also triggered into conduction. With the rectifier D₃ conducting a positive potential is applied at the starter rod 94 of ignitron S₂, which subsequently fires. Consequently, the reverse current flow shunts the capacitor bank.

If successive high power impulses are desired, the adjustable arm 86 on the control autotransformer T₁ may be moved to regulate the selected voltage level on the capacitor bank which will give a surge of preselected magnitude. If a time delay interval of greater duration is required than that used for the first surge, time delay control 92 can be adjusted to provide a time interval corresponding to the new voltage level. The pushbutton of switch 54 is once again depressed, and the capacitors C₁, C₂, and C₃ of the capacitor bank are charged and finally discharged after a prescribed time interval to direct a second high power impulse through the windings 20 and 30. This cycle of operation may be repeated as often as desired for each subsequent impulse of power.

It will be appreciated that, although in the illustrated exemplification the principles of my invention were applied to dynamoelectric machine windings, the invention can be advantageously employed for electrical coil alterations in other electromagnetic and electrical inductive devices where it is necessary to alter the original configuration of the coils. By alteration is meant, without intending to limit the use of the term, any modification of relative positions of the coil turns or parts thereof, change in the overall cross section of at least some portions of the coil or coils, as well as of the total length thereof, and change of the relative positions of the coil turns or turn portions with respect to the member accommodating certain parts of the coil or coils. In addition, although my invention was illustrated in connection with the simultaneous application of high power impulses to two entire windings, it will be obvious to those skilled in the art that one or more coils of a single cooperative pair of magnetic poles may be simultaneously acted upon, rather than all of the poles.

While in accordance with the patent statutes, I have described what at present are considered to be the preferred embodiments of my invention, it will be obvious to those skilled in the art that numerous changes and modifications may be made therein within the true spirit and scope of the invention.

What I claim as new and desire to secure by Letters Patent of the United States is:

1. A method for altering the configuration of at least one electrical coil carried by a first coil accommodating member and defining a magnetic pole, the method comprising the steps: supporting at least one other electrical coil carried by a second coil accommodating member and defining a magnetic pole in a predetermined adjacent position relative to the one coil, with the magnetic poles for the respective electrical coils being in the proximity of one another; and applying at least one electrical power impulse generally concurrently to said one and said one other electrical coils to produce current flows therein and to establish magnetic fields, with the current flows and fields interacting to effect alteration of at least said one electrical coil carried by a first coil accommodating member into the desired configuration.

2. A method for altering the configuration of at least one electrical coil wound of a number of insulated conductor turns carried by a first coil accommodating members including a magnetic core and defining a magnetic pole, the method comprising the steps: supporting at least one other electrical coil carried by a second coil accommodating member in a predetermined adjacent position relative to the one electrical coil, with the electrical coils being in proximity of one another and with the first and second coil accommodating members being fixedly maintained relative to one another; and applying at least one electrical power impulse of predetermined intensity below that which deleteriously affects the insulation of the one electrical coil simultaneously to said one and other electrical coils to produce current flows therein and to establish magnetic fields with the current flows and fields interacting to effect alteration of at least said one electrical coil into the desired configuration.

3. A method for compacting at least one winding coil carried on a coil accommodating member and defining a magnetic pole, the method comprising the steps: supporting at least one other electrical coil defining a magnetic pole by another coil accommodating member adjacent to the magnetic pole of the one electrical coil, applying at least one high electrical power surge simultaneously to said one and other electrical coils to produce current flow through said one other electrical coils and to establish magnetic fields thereby causing an interaction between the coils at the adjacent magnetic poles to effect compaction of at least said one electrical coil.

4. A method for altering the configuration of a first winding formed by a number of electrical coils carried on a coil accommodating member and defining a number of magnetic poles, the method comprising the steps: supporting a second winding formed by a number of coils defining magnetic poles corresponding in number to the magnetic poles for the first winding, with the magnetic poles of the first winding being adjacent the magnetic poles of the second winding; and applying at least one high electrical power surge simultaneously to said first and second windings to produce current flows therein and to establish magnetic fields, with the current flows and fields effecting alteration of at least said first winding into the desired configuration.

5. A method for altering the configuration of at least one electrical coil in first and second windings, with each winding being carried on a winding accommodating member, the method comprising the steps: supporting at least one coil of the first winding in a predetermined adjacent position relative to at least the one coil of the second winding by separate winding accommodating members held stationary with respect to one another; and directing at least one high electric power surge simultaneously to the adjacent coils of said first and second windings to establish current flows therein and magnetic fields having an interaction therebetween thereby producing forces acting on the adjacent coils to effect alteration of said adjacent coils into the desired configuration.

6. A method of altering the configuration of at least a first electrical winding means, wound of a number of insulated individually movable conductor turns, having side portions loosely accommodated in preselected slots of a first member including a magnetic core formed with a plurality of angularly spaced apart slots and a bore inwardly of the slots; the method comprising the steps: positioning a second electrical winding means accommodated by a second member in the bore of the core; holding the first and second members in a predetermined relation; and effecting movement of at least the side portions of the first winding means accommodated in the preselected slots of the first member away from the second member and producing compaction of the side portions by the application of at least one power impulse of predetermined intensity, below that which deleteriously affects the insulation of the first winding means, to said first and second winding means thereby creating electromagnetic forces for acting upon at least the first winding means to effect the desired alteration thereof.

References Cited

UNITED STATES PATENTS

| | | | |
|---|---|---|---|
| 2,377,175 | 5/1945 | Peer | 318—220 |
| 2,506,173 | 5/1950 | Polard | 29—205 |
| 2,691,306 | 10/1954 | Beams et al. | 310—166 |
| 2,976,907 | 3/1961 | Harvey | 153—10 |
| 3,092,165 | 6/1963 | Harvey | 153—2 |
| 3,115,857 | 12/1963 | Pfanner | 113—44 |

(Other references on following page)

OTHER REFERENCES

Furth et al.: Scientific American, vol. 198, February 1958, pp. 28–33.

Seely: Introduction to Electromagnetic Fields, 1958, McGraw-Hill, pp. 269–274.

Moulin: The Principles of Electromagnetism, 2nd edition, 1950, Oxford at the Clarendon Press, pp. 234 and 235.

Crow: Design, Construction and Operating Principles of Electromagnets for Attracting Copper, Aluminum and Other Non-Ferrous Metals, 1951, The Scientific Book Publishing Co., p. 22.

Geary: Magnetic and Electric Suspensions, 1964, SIRA Research Report R 314, pp. 61–65.

JOHN F. CAMPBELL, *Primary Examiner.*

J. L. CLINE, *Assistant Examiner.*

UNITED STATES PATENT OFFICE

CERTIFICATE OF CORRECTION

Patent No. 3,333,335                                            August 1, 1967

Marion W. Sims

It is hereby certified that error appears in the above numbered patent requiring correction and that the said Letters Patent should read as corrected below.

Column 6, line 41, for "forces" read -- force --; column 9, line 60, for "a" read -- said --; lines 64 and 65, for "members read -- member --; column 10, line 13, for "coils" read -- coil --.

Signed and sealed this 3rd day of June 1969.

(SEAL)
Attest:

Edward M. Fletcher, Jr.
Attesting Officer

Commissioner of Patents